Aug. 25, 1959 D. WISKOTT ET AL 2,901,627

METHOD OF AND APPARATUS FOR THE ELECTRONIC MAGNIFICATION OF OBJECTS

Filed Feb. 17, 1954 6 Sheets-Sheet 1

INVENTORS:
DETMAR WISKOTT
GÜNTER BARTZ
GUSTAV WEISSENBERG

BY

Richardson, David and Nordon
ATTY'S.

INVENTORS:
DETMAR WISKOTT
GÜNTER BARTZ
GUSTAV WEISSENBERG
BY
Richardson, David and Nordon
ATT'YS.

INVENTORS:
DETMAR WISKOTT
GÜNTER BARTZ
GUSTAV WEISSENBERG
BY
Richardson, David and Nordon
ATTY'S INVENTORS:
DETMAR WISKOTT
GÜNTER BARTZ
GUSTAV WEISSENBERG
BY
Richardson, David and Nordon
ATTY'S.

INVENTORS:
DETMAR WISKOTT
GÜNTER BARTZ
GUSTAV WEISSENBERG
BY
Richardson, David and Nadon
ATTY'S.

INVENTORS:
DETMAR WISKOTT
GÜNTER BARTZ
GUSTAV WEISSENBERG
BY
Richardson, David and Nordon
ATTY'S.

United States Patent Office 2,901,627
Patented Aug. 25, 1959

2,901,627

METHOD OF AND APPARATUS FOR THE ELECTRONIC MAGNIFICATION OF OBJECTS

Detmar Wiskott, Günter Bartz, and Gustav Weissenberg, Marburg an der Lahn, Germany, assignors to Ernst Leitz G.m.b.H., Wetzlar, Germany, a corporation of Germany Application February 17, 1954, Serial No. 410,795

Claims priority, application Germany February 19, 1953

6 Claims. (Cl. 250—49.5)

The present invention relates to a method for forming an image of an electrical potential field and to a system capable of performing the method.

It is an object of the present invention to form the image by reflection of electrons.

It is another object of the present invention to enable the reflected electrons to trace a picture of an object.

It is a further object of the present invention to trace the picture of the object on an enlarged or reduced scale.

It is still another object of the present invention to provide means for varying the magnitude of the enlargement or reduction.

Other objects and advantages of the present invention will become apparent from the following detailed description thereof when read with reference to the accompanying drawings, which show some illustrative embodiments of the present invention.

Figure 1:
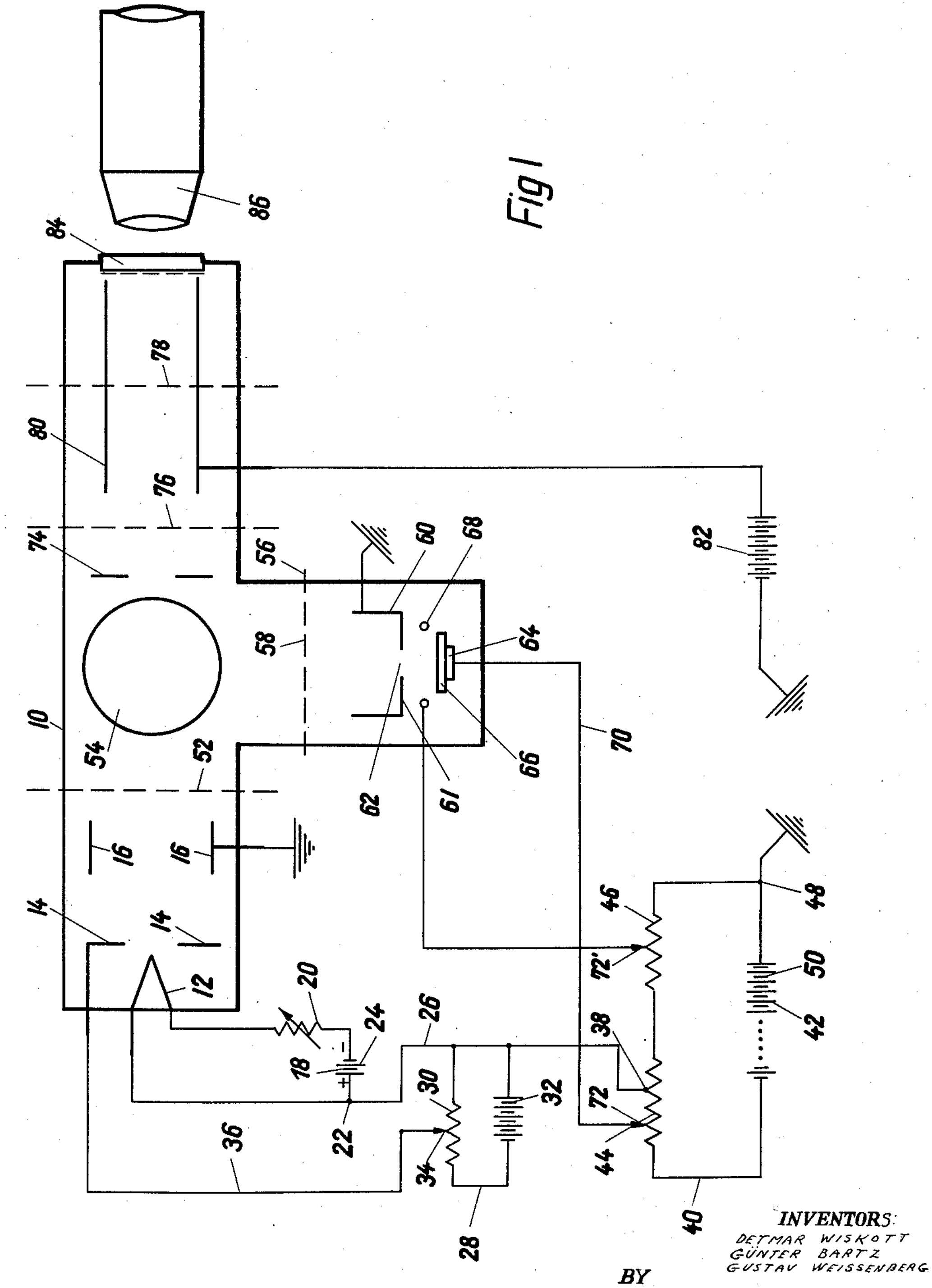
Fig. 1 is a diagrammatic side elevation of a first embodiment of the present invention.

Referring now to the drawings, and first to Fig. 1, the system comprises an evacuated elongated tube or vessel 10 provided with a cathode 12, e.g., a glow cathode, a collecting electrode or Wehnelt cylinder 14, and a hollow cylindrical anode 16 which is grounded. The cathode 12 is electrically heated by a battery 18 over a resistor 20. The junction 22 of cathode 12 and one terminal 24 of the battery 18 is connected by means of a conductor 26 to a circuit 28 which includes in series a resistor 30 and a battery 32 having a larger number of cells than battery 18 for supplying a higher voltage. The resistor 30 is provided with an adjustable contact 34 connected with the Wehnelt cylinder 14 by means of a conductor 36. The battery 32 is connected to the conductor 26 which completes circuit 28 and which is connected to junction 22 of cathode 12 and battery 18, as described, so that the Wehnelt cylinder 14 is at a slightly negative potential with respect to the mean potential of cathode 12. Conductor 26 extends beyond circuit 28 to an intermediate point 38 of a resistor 44 which is included in a circuit 40. The circuit 40 includes in series connection a high voltage battery 42 and two resistors 44 and 46. The junction 48 of resistor 46 and one terminal 50 of battery 42 is grounded, i.e. kept at the same potential as the anode 16. Consequently, cathode 12 is maintained at a much lower potential than the grounded anode 16. As a result, electrons emitted by cathode 12 will be accelerated in the electric field set up between the cathode 12 and the hollow cylindrical anode 16 and will pass an electrostatic, magnetostatic or electromagnetic lens 52, producing an image of the cathode 12 in the border zone of a transverse magnetic field indicated by 54 and produced by magnetostatic or electromagnetic means (not shown).

Figure 2:
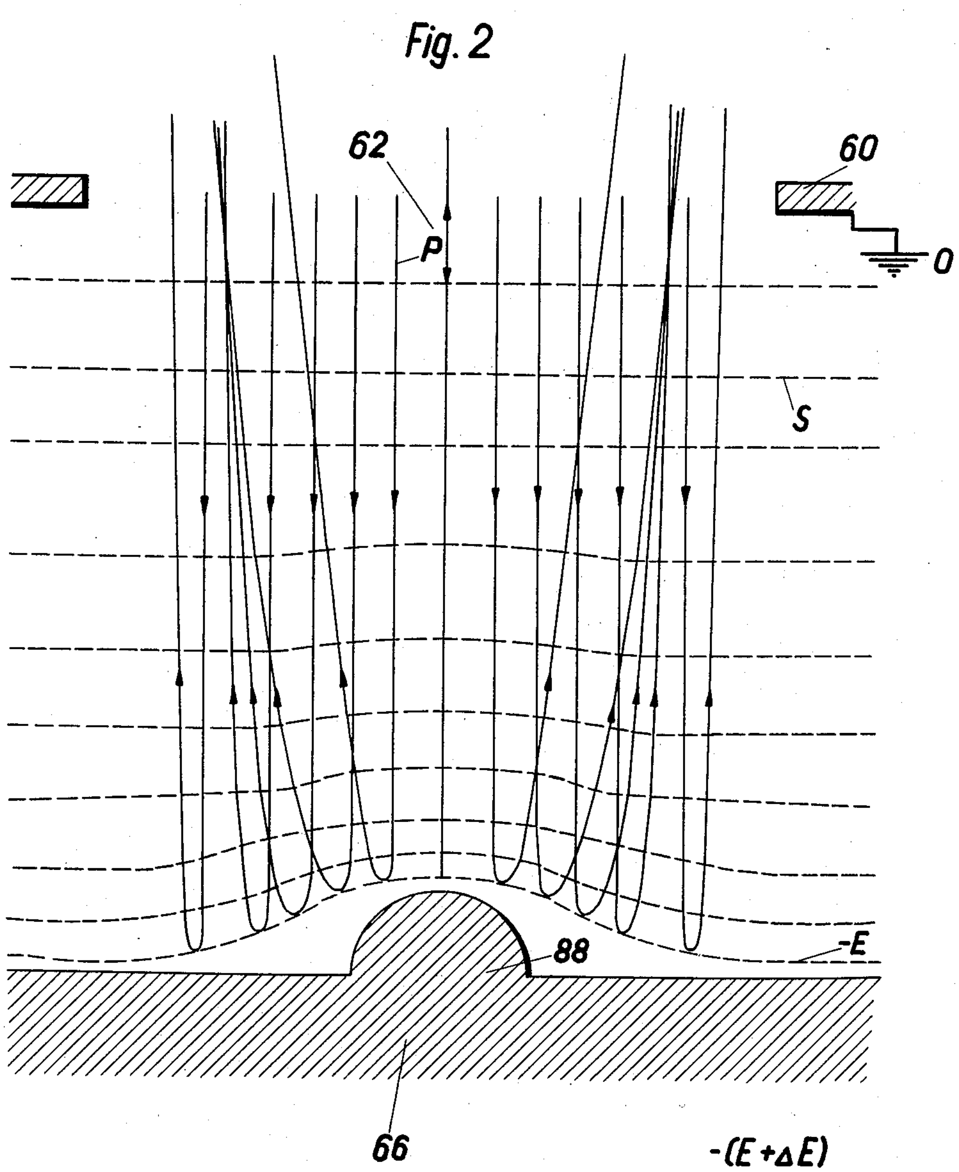
Fig. 2 is a diagram of a portion of Fig. 1 on an enlarged scale.

The transverse magnetic field 54 deflects the electrons by an angle of for instance 90° into a lateral extension 56 of the tube 10 for passing an electron lens 58 arranged across the lateral extension 56 near the entrance thereof. The electron lens 58 serves to align the paths of the deflected electrons so that they will be parallel. A first electrode 60 shown as an electron diaphragm is kept at the same potential as the cylindrical anode 16, i.e., ground. The first electrode or diaphragm 60 includes a first circular plate 61 provided with a central aperture 62 arranged in the path of the deflected electron beam so that the beam passes in a predetermined direction toward a second electrode 64 shaped as a second circular plate. The electrons are prevented from actually reaching the second electrode 64, however, by an object 66 which rests on the second electrode 64 (Fig. 2). Preferably a ring-shaped electrode 68, hereinafter described in detail, is arranged between the first and second electrodes with the resistor 44. Consequently, the second electrode 64 is at a negative potential with respect to the first electrode or diaphragm 60, the potential of the electrode 64 almost being nearly the same as that of contact 38, conductor 26, and cathode 12.

The operation of this system is as follows:

The deflected electron beam is reflected, as more fully explained hereinafter, by the object 66 resting on the second electrode 64 and leaves aperture 62 in first circular plate 61 in a direction opposite to that by which it entered. The reflected electron beam passes back through electron lens 58 and forms an image at the opposite border zone of the transverse magnetic field 54 so as to continue the original path of the electrons emitted by cathode 12 and accelerated by anode 16. This continued path extends consecutively past a diaphragm 74 and electron lenses 76 and 78. A cylindrical anode 80 is preferably arranged between the electron lenses 76 and 78 in order to after-accelerate the electron beam, a battery 82 maintaining the anode 80 at suitable potential. The electron lens 76 forms the objective lens, and the electron lens 78 the projecting lens tracing an image on a screen 84 arranged at the end wall of the tube 10 opposite to the cathode 12. The image can be observed or photographed by means of microscope 86 or the like.

Referring now to Fig. 2 for explanatory purposes, the object to be observed 66 possesses an upwardly extending hemispherical projection 88. Assuming that a negative potential $-(E+\Delta E)$ is imparted to the object 66, a potential field will exist between object 66 and diaphragm 60 containing an equipotential surface —E. The electrons, which are accelerated to a predetermined velocity on their downward path by diaphragm 60, will be reflected by the equipotential surface —E. The reflected electrons will again be accelerated by diaphragm 60 to the predetermined velocity, but now in the reverse direction. The paths travelled by the electrons are indicated by lines $p$. Since the paths of the incident electrons generally parallel each other, the paths of the reflected electrons are influenced by the forces of the electric field given by the orthogonal trajectories with respect to the equipotential surfaces S. These equipotential surfaces S approximate the shape of projection 88 more accurately as they approach it more closely. Thus the intensity distribution of the returning electrons in the hole 62 of the diaphragm 60 is dependent on the potential field of the object 66. By making $\Delta E$ as small as possible, the equipotential surface —E will conform substantially to the object 66, 88.

It should be noted that the object 66 is not actually hit by the electrons; rather the electrons are reflected at the equipotential surface —E, which has a shape dependent upon the shape of the surface of the projection 88 of the object 66 if the latter is electroconductive. If the object consists of insulating material, the shape of the equipotential surface —E is dependent upon the dielectric properties of the projection 88. In any case, the shape of the equipotential surface —E closely follows the shape of the projection 88. It should be noted, that also the object is not damaged if its potential relative to the cathode is slightly positive, for instance +0.5 v.

The extent or power of magnification is given by the ratio of the sizes of the second electrode 64 carrying the object 66, and the electrode next to the object 66 and by the distance of these electrodes which preferably is variable. However, in order to vary the power of magnification, according to an improvement of the present invention, the ring-shaped electrode 68 is arranged between the first and second electrodes 60 and 64, respectively, being connected to a source of variable potential. This will now be more fully explained with reference to Figs. 6–15.

Figure 6:
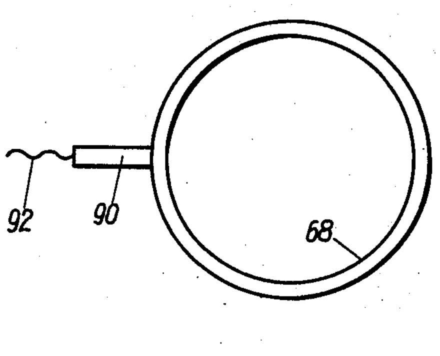
Fig. 6 is a plan view on an enlarged scale of a detail forming part of Figs. 1, 3 and 4.

Fig. 6 shows the ring-shaped electrode 68 in plan on an enlarged scale. The ring-shaped electrode 68 is provided with a short conductive member or extension 90 forming a continuation of a diameter of the electrode 68. A conductor 92 is attached to extension 90 for imparting an intermediate potential to the electrode 68 as more fully to be explained hereinafter.

Figure 7:
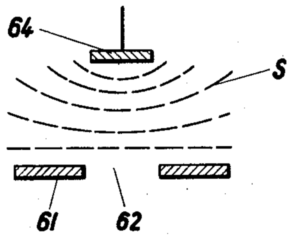
Figs. 7 and 8 show, respectively, on an enlarged scale, details of two embodiments of the present invention with indication of equipotential lines of the electrical field.

In Fig. 7, the first circular plate 61 is provided with a hole 62. Second plate 64 has a much smaller diameter than first plate 61. Thus when a negative potential is applied to second plate 64 relative to the potential of first plate 61, an electric field is generated in the space between the plates 61 and 64, the equipotential surfaces S of which are practically plane in the neighborhood of the first plate 61 and curved near the second plate 64. The equipotential surfaces S are concave with respect to the second plate 64 and act as an electrostatic divergent mirror for electrons reflected by an object (not shown) or by an equipotential surface in the immediate neighborhood of the object.

Figure 8:
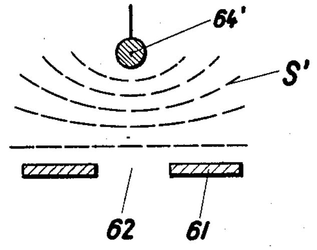

The embodiment shown in Fig. 8 differs from that shown in Fig. 7 in that the second electrode is designed as a sphere 64′ having a diameter which is a fraction of the diameter of the first plate-shaped electrode 61. The center of sphere 64′ is disposed along the axis of hole 62 of the first plate-shaped electrode 61. As a result the equipotential surfaces S′ in the neighborhood of the sphere 64′ are even more curved than the equipotential surfaces S shown in Fig. 7.

Figure 9:
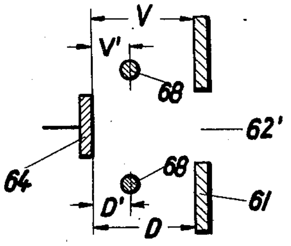
Fig. 9 is a diagram similar to Fig. 7 with an additional part.

Referring now to Fig. 9 of the drawings, the ring-shaped electrode 68 is arranged at a distance D′ from the plane of the second electrode 64, between the first and second plate-shaped electrodes 61 and 64, respectively, the distance of which is designated as D. V denotes the difference in potential between the first and second electrodes 61 and 64, respectively, while V′ denotes the difference in potential, between ring-shaped electrode 68 and second electrode 64.

Figure 10:
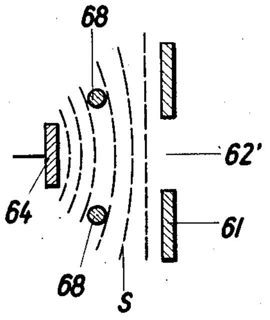
Fig. 10 is the diagram shown in Fig. 9 with equipotential lines added.

In Fig. 10, the equipotential surfaces S are shown as they exist between the plates 61 and 64 when no potential is applied to the ring-shaped electrode 68. The ring-shaped electrode 68 does not affect the electrostatic field existing between electrodes 61 and 64. However, these conditions are changed when a potential is applied to the ring-shaped electrode 68 as shown in Figs. 11 and 12.

Figure 11:
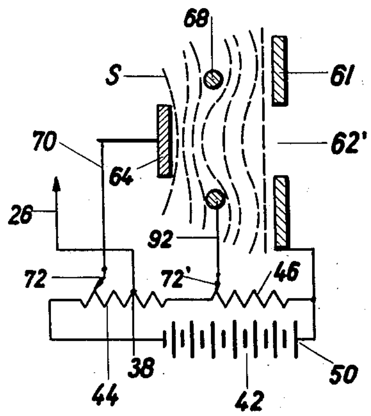
Figs. 11 and 12 show diagrams similar to that of Fig. 10 with additional potential producing means and the equipotential lines of the electrical fields in two different operative positions, respectively.
Figure 12:
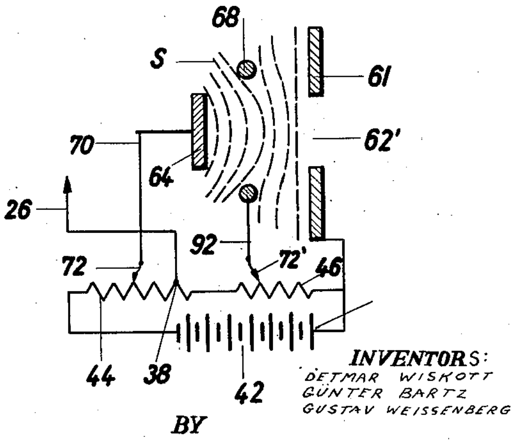

In both Figs. 11 and 12 battery 42 is connected at one end to the first electrode 61. The resistors 44 and 46 are connected in series with each other and bridge the battery 42 in the same manner as in the embodiment of Fig. 1. Likewise the electrode 64 is connected to the variable contact 72 by the conductor 70. However, the adjustable contact 72′ cooperating with the resistor 46 is connected through the conductor 92 to the ring-shaped electrode 68. Consequently, a potential is imparted to the ring-shaped electrode 68 which has a distorting effect on the electrostatic field existing between the electrodes 64 and 61. In Fig. 11 the adjustable contact 72′ is arranged near the junction of the resistor 46 and the resistor 44, whereby the equipotential surfaces S of the resulting electrostatic field are bent toward the second electrode or plate 64 so that the power of magnification is reduced. In Fig. 12 the adjustable contact 72′ is shown near the end of the resistor 46 which is remote from battery 42 so that an intermediate potential is applied to the ring-shaped electrode 68, thereby distorting the equipotential surfaces S as shown. Consequently, the power of magnification is increased.

Figure 13:
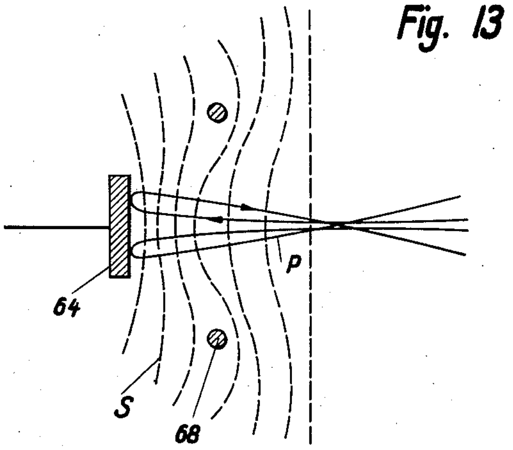
Figs. 13 to 15 show parts of Figs. 11 and 12, respectively, on a still larger scale with the paths of some electrons.
Figure 14:
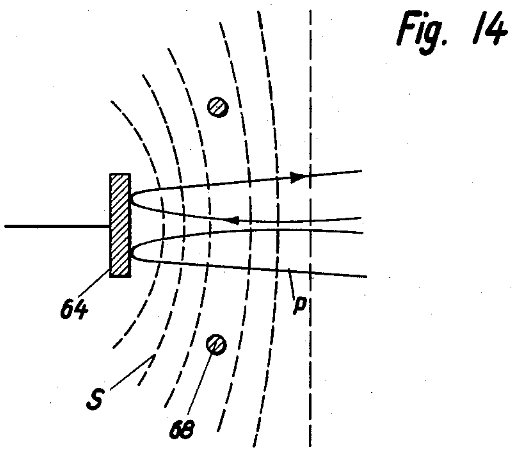
Figure 15:
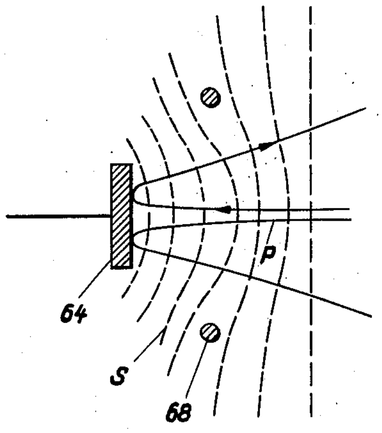

Figs. 13, 14 and 15 show the electrode 64, the ring-shaped electrode 68, and the equipotential surfaces S of Figs. 11, 10 and 12, respectively, on an enlarged scale. The paths of the electrons are designated by $p$, as before. The field distribution alters the paths $p$ of the electrons and thereby the scale of the enlargement of the image. Since the paths $p$ are influenced by the orthogonal trajectories of the equipotential surfaces S, the bending of these surfaces determines the electron paths. In Fig. 13 the paths of the electrons are bent toward the optical axis of the system, whereas in Fig. 15 the paths of reflected electrons diverge from the optical axis of the system with respect to Fig. 14.

Figure 3:
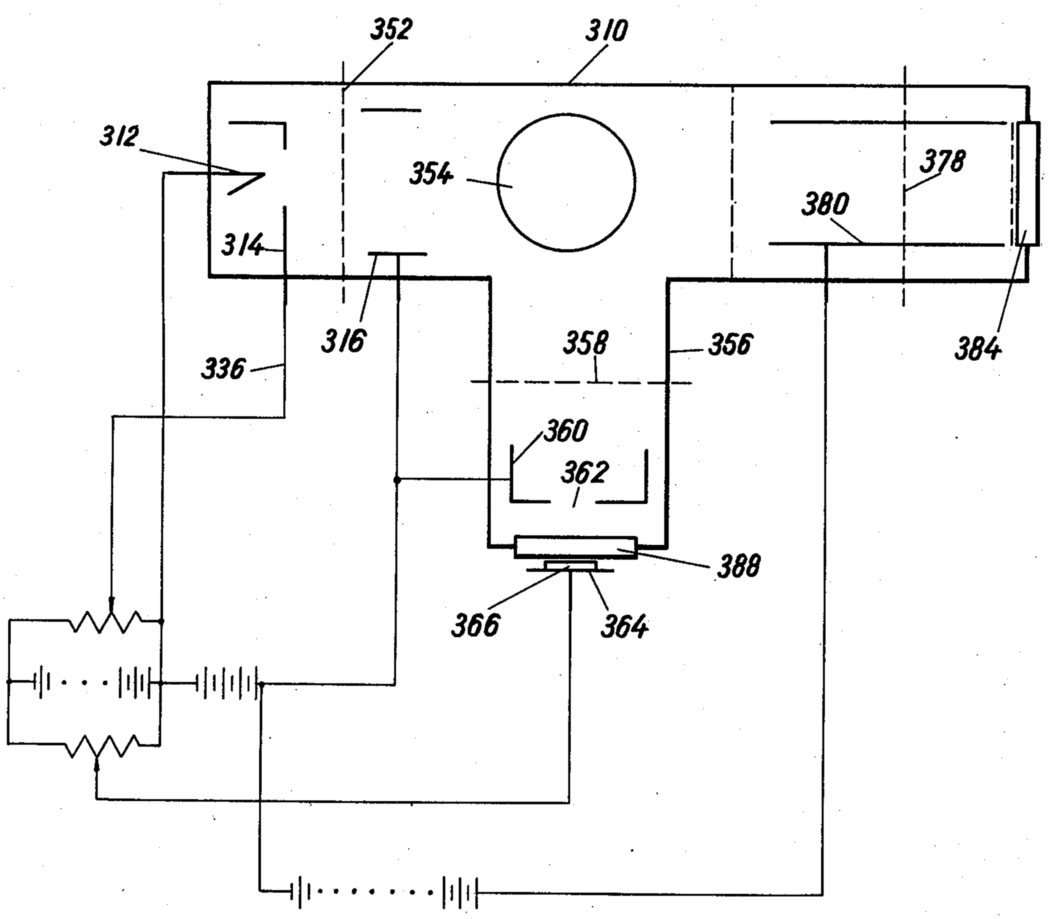
Fig. 3 is a diagrammatic side elevation of another embodiment of the present invention.

Referring now to Fig. 3 of the drawings showing an embodiment of the present invention in which the object (not shown) is arranged outside the vacuum, the potential field acts through a homogeneous dielectric window 388, which comprises a substance of low dielectric constant such as quartz glass. 310 denotes the evacuated tube, 312 denotes the cathode, and 352 denotes the electron-optical means for rendering parallel the paths of the electrons emitted by cathode 312 and accelerated by anode 316. 354 is a device for producing a magnetic field of sufficient strength to deflect the electron beam by an angle for instance 90° toward homogeneous dielectric window 388. 376 and 378 are further electron-optical means such as diaphragms or electron lenses, 384 is a luminous screen, and 364 is the second electrode, the potential field of which is to be investigated. The electrons coming from the cathode 312 are collected into an electron beam by the electron-optical means 352 and deflected by the magnet 354 toward the window 388 which they reach after passing the lens 358 and the first electrode 360 provided with a hole or aperture 362. A negative potential of suitable magnitude relative to cathode 312 is imparted to the electrode 364 so that the reflecting surface, i.e., the zero equipotential surface, lies within the extension 356 of the vacuum tube 310. The electrons are reflected from this surface and are re-accelerated by the first electrode 360 which is at the same potential as the anode 316. Accordingly, the electrons upon reaching the magnet 354 are reflected by 90° to resume their initial direction and to pass the electron-optical means 376 and 378. Thereafter they are further accelerated by anode 380 to provide sufficient energy for exciting the screen 384 to a strong fluorescence.

If the electrode 364 is designed so that it is to be regarded as homogeneous considering the resolving power of the arrangement, and if an object or a preparation (not shown) is placed on the electrode 364, the preparation being either a dielectric or a conductive substance, these parts will act as disturbances of the potential field and an image thereof will be formed by the electron rays. Thus it will be seen that with the device an electron microscopy can be effected which has particular advantages. The object is arranged outside the evacuated tube and is not heated by the electrons forming the image since the latter do not reach the object. Also the parts of the device which are under vacuum can be sealed so that no pumps are needed for operation. The formation of the image is effected according to principles which are different from those heretofore relied upon in usual electron microscopy. The electrons need have only sufficient velocity to render a fluorescent screen luminous or to blacken a photographic plate. Generally, electrons accelerated by a potential difference of 3,000 to 5,000 volts are sufficient for this purpose so that cumbersome and costly high voltage installations are also avoided. In order not to connect the measuring electrode to an excessively high voltage, the scanning can be carried out by means of very slow electrons which can be subjected to an after-acceleration by means known in the art, e.g., by means cooperating with the electron-optical means 376, 378.

Figure 4:
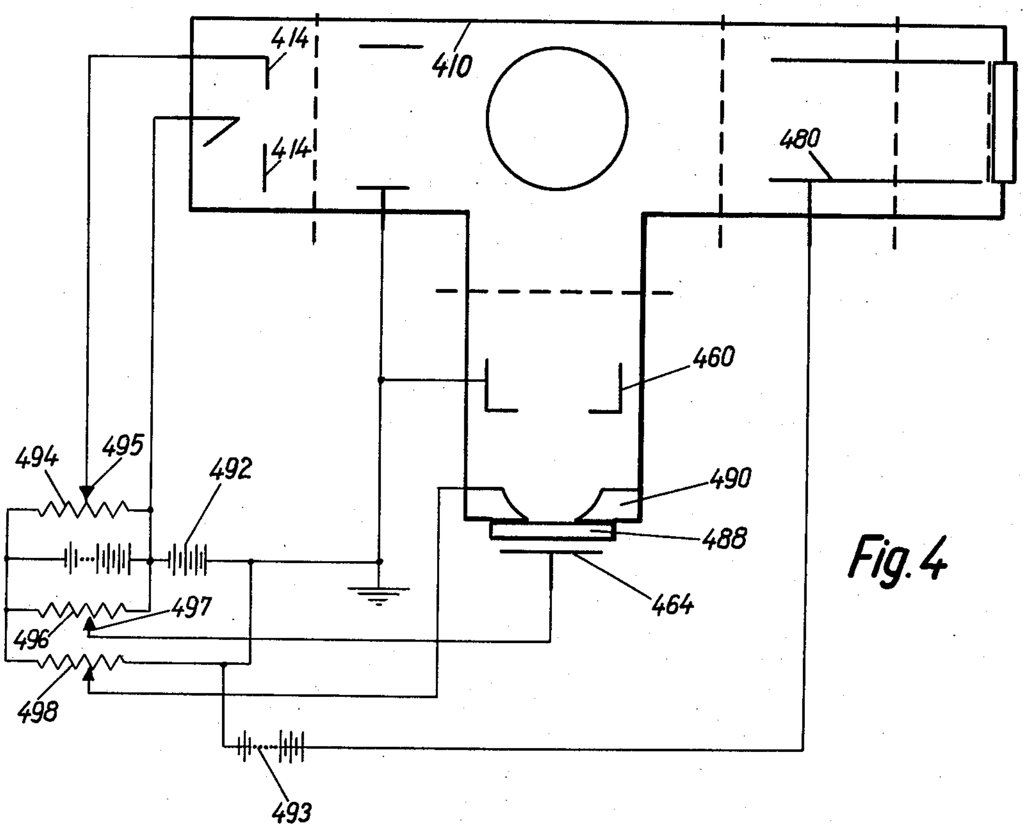
Fig. 4 is a similar side elevation of a further embodiment of the present invention.

The deviation of the zero equipotential surface from the true contour of the object increases with distance. In order to obtain true images certain considerations should therefore be taken into account. For re-accelerating the electrons reflected by the zero equipotential surface, a counter-electrode 460 is provided (Fig. 4). The surface of the counter-electrode 460 is always an equipotential surface no matter whether or not an object is present on the electrode 464. In order to attain that the zero-equipotential surface lies inside of the vacuum tube and is as true as possible to the contour of the object, the dielectric plate 488 is made as thin as possible and of a substance having as low a dielectric constant as possible.

Figure 5:
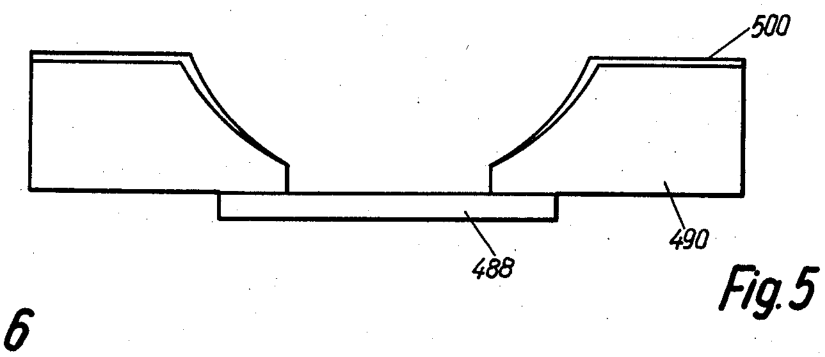
Fig. 5 shows a modification of an element shown in Fig. 4 on an enlarged scale.

The potential field is strongly distorted at the periphery of the dielectric 488 by the vacuum tube 410 which consists mostly of metal. This distortion of the field may have an effect reaching as far as the middle of the dielectric plate 488. In order to reduce or even entirely to eliminate this distortion, the counter-field is applied by means of a separate electrode. A preferred embodiment is shown in Fig. 5 in which 488 is the dielectric plate and 490 a spherically ground plate, as in Fig. 4, which for instance consists of glass. Plate 490 is provided with an electroconductive coating or lining 500 which is connected with a preferably continuously adjustable potential so that the potential surfaces passing through the dielectric plate 488 are deflected at the border zone thereof. By the continuous adjustment of the potential of this electrode 500 the distortion of the field can be controlled. Fig. 4 shows the connections of these parts; 492 and 493 are batteries, the battery 493 supplying the voltage for the after-acceleration of the electrons by means of the anode 480 having the same effect as the anode 380 shown in Fig. 3. The voltage of the Wehnelt cylinder 414 can be adjusted by the adjustable contact 495 of a resistor 494. A resistor 496 having an adjustable contact 497 permits regulation of the potential difference between the object (not shown) and the electrode 464. A resistor 498 has an adjustable contact 499 connected to the electrode 490 or the coating 500 thereof so that the potential of the latter is also adjustable.

If desired, the embodiments shown in Figs. 3–5 may be provided with a ring-shaped electrode (not shown) analogous to the ring-shaped electrode 68 disclosed hereinabove and arranged adjacent dielectric window such as 388 within a lateral extension such as 356.

Various changes and modifications may be made without departing from the spirit and scope of the present invention and it is intended that such obvious changes and modifications be considered within the purview of the annexed claims.

We claim:

1. A system for the production of an image of an electrical potential field existing in front of the surface of an object, by the reflection of electrons; comprising first, second and third communicating evacuated tubes having intersecting longitudinal axes, the axis of the second tube bisecting the angle formed by the axes of the first and third tubes, means disposed within said first tube for producing an electron beam directed axially thereof and including a cathode, a collecting electrode and means for accelerating said electron beam within said first tube, means at the junction of said three tubes for deflecting said electron beam axially of said second tube toward the free end thereof, a first electrode disposed in said second tube and having an aperture formed therein, said first electrode being maintained at the same potential as said accelerating means, and a second electrode aligned with said deflecting means and with said aperture of said first electrode, said second electrode being maintained substantially at the potential of said cathode and serving as a carrier for said object, whereby said electron beam is reflected axially of said second tube by said second electrode prior to coming in contact therewith, means within said tubes for deflecting said reflected electron beam axially of said third tube, and screen means for receiving said deflected reflected electron beam, whereby an image is obtained on said screen means corresponding to the configuration of said object disposed on said second electrode.

2. A system according to claim 1, wherein the first and third tubes are disposed at an angle of 180° relative to each other.

3. A system according to claim 1, wherein said second tube is provided with a window composed of homogeneous dielectric material disposed at its free end and aligned between said aperture of said first electrode and said second electrode, said second electrode being disposed outside said second tube and adjacent to said window.

4. An electron-optical system comprising in combination, an evacuated elongated tube having a lateral extension, means at one end of said tube for producing an electron beam directly axially of the tube, deflecting means disposed intermediate the ends of said tube in alignment with said lateral extension, said deflecting means including means for deflecting said electron beam into said extension, a first electrode disposed in said extension and extending transversely thereof, said first electrode being apertured to provide a passage for the deflected electron beam, a second electrode in alignment with said passage in said first electrode, said second electrode being disposed beyond said first electrode to receive electrons from said deflecting means through said passage, an energizing circuit for said first and second electrodes which maintains both of said electrodes at a potential which is positive with respect to said means for producing said electron beam and which further maintains said second electrode at a potential which is negative with respect to said first electrode, the magnitude of said last-named potential and the configuration of said first and second electrodes producing an equipotential surface in close proximity to an object to be observed which is supported on said second electrode, said equipotential surface conforming closely to the surface configuration of said object and reflecting all electrons before they reach said object, said reflected electrons returning back through said passage toward said deflecting means for deflecting reflected electrons longitudinally of said passage toward the other end thereof, an anode disposed in said tube intermediate said deflecting means and said other end for accelerating reflected electrons, continuous screen means disposed in the path of electrons accelerated by said anode for producing an image of said object, and electron-optical means disposed intermediate said screen means and said deflecting means for modifying the size of said image.

5. An electron-optical system according to claim 4, wherein said first electrode includes a circular plate which is centrally apertured to provide said passage and in which said second electrode is spherical, the diameter of said spherical electrode being smaller than the diameter of said plate.

6. An electron-optical system according to claim 4, further comprising an annular electrode disposed intermediate said first and second electrodes in alignment with said passage, said annular electrode encircling the path of electrons traveling between said first and second electrodes, and an energizing circuit connected to said annular electrode which maintains said annular electrode at a potential intermediate the potentials of said first and second electrodes.

References Cited in the file of this patent

UNITED STATES PATENTS

| | | |
|---|---|---|
| 2,241,432 | Von Ardenne et al. | May 13, 1941 |
| 2,330,930 | Snyder | Oct. 5, 1943 |
| 2,372,422 | Hillier | Mar. 27, 1945 |
| 2,450,602 | Levialdi | Oct. 5, 1948 |
| 2,799,799 | Weissenberg | July 16, 1957 |

FOREIGN PATENTS

| | | |
|---|---|---|
| 1,064,426 | France | Dec. 23, 1953 |

OTHER REFERENCES

Zworykin et al.: Photoelectricity and Its Applications, J. Wiley and Sons, Inc., New York, 1949, pages 172–173.

Schaffernicht, in Photosurfaces, British Intelligence Objectives Sub-Committee, Final Report, No. 530, Item No. 9, 1947, pages 55–56.

Myers: Electron Optics, D. Van Nostrand Co., New York, 1939, pages 408–409.